Figure 1:
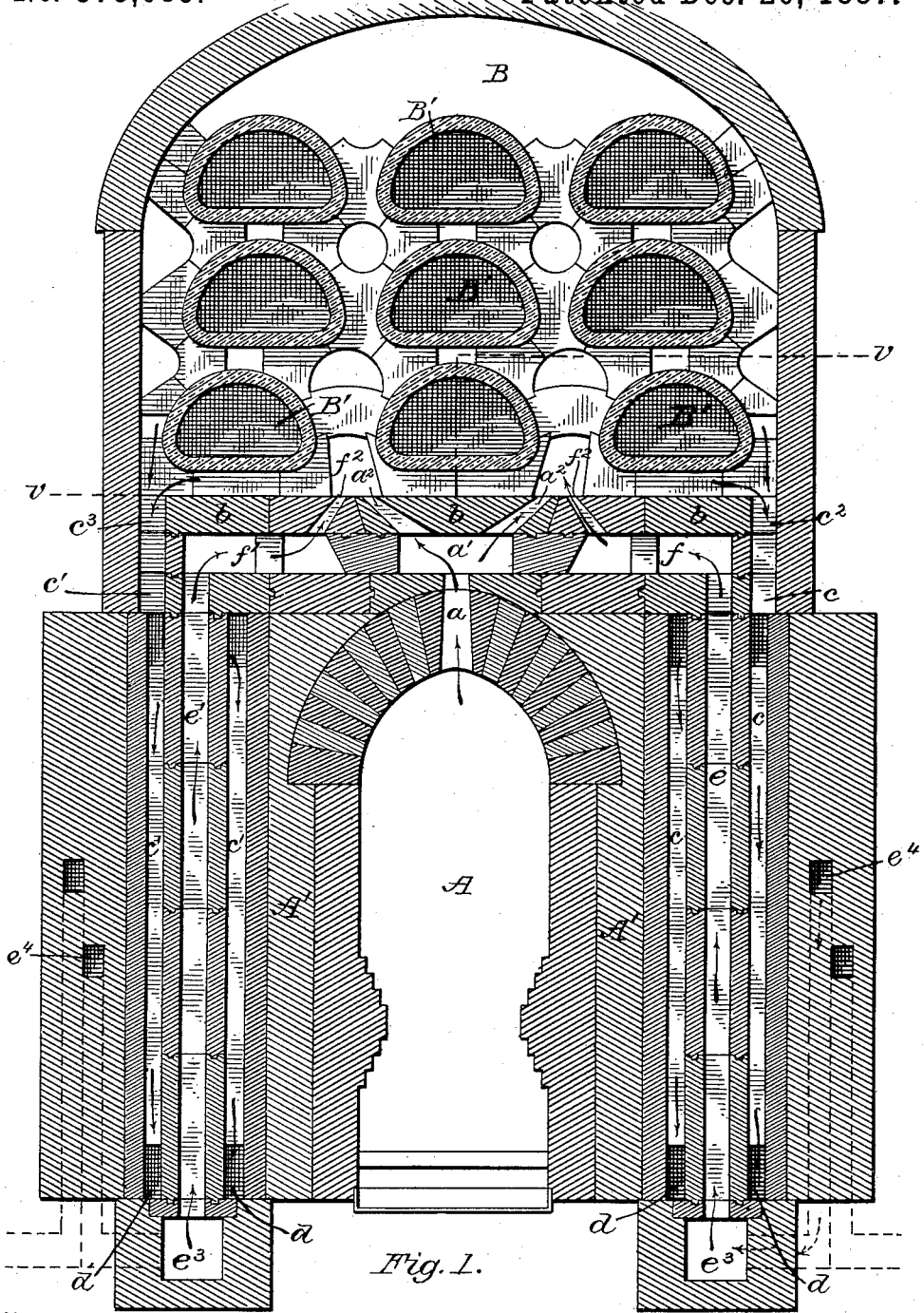

(No Model.) 6 Sheets—Sheet 1.

G. A. McILHENNY.
GAS RETORT FURNACE.

No. 375,085. Patented Dec. 20, 1887.

Witnesses
Philip F. Larner
Lowell Bartle

Inventor
George A. McIlhenny.
By his Attorney (No Model.) 6 Sheets—Sheet 2.
G. A. McILHENNY.
GAS RETORT FURNACE.

No. 375,085. Patented Dec. 20, 1887.

Witnesses
Philip F. Larner.
Lowell Bartle

Inventor
George A. McIlhenny
By his Attorney (No Model.) 6 Sheets—Sheet 4.
G. A. McILHENNY.
GAS RETORT FURNACE.

No. 375,085. Patented Dec. 20, 1887.

Witnesses
Philip F. Larner.
Lowell Battle

Inventor
George A. McIlhenny
By his Attorney (No Model.) 6 Sheets—Sheet 6.

G. A. McILHENNY.
GAS RETORT FURNACE.

No. 375,085. Patented Dec. 20, 1887.

Witnesses
Philip F. Larner.
Howell Bartle

Inventor
George A. McIlhenny.
By his Attorney

UNITED STATES PATENT OFFICE.

GEORGE A. McILHENNY, OF WASHINGTON, DISTRICT OF COLUMBIA.

GAS-RETORT FURNACE.

SPECIFICATION forming part of Letters Patent No. 375,085, dated December 20, 1887.

Application filed April 11, 1887. Serial No. 234,426. (No model.)

*To all whom it may concern:*

Be it known that I, GEORGE A. MCILHENNY, of the city of Washington, in the District of Columbia, have invented certain new and useful Improvements in Gas-Retort Furnaces; and I do hereby declare that the following specification, taken in connection with the drawings furnished and forming a part of the same, is a clear, true, and complete description of my invention.

My said improvements relate to what are known as "recuperative furnaces," and which involve the use of highly-heated air in the presence of the carbonic oxide, which passes from the fire-pot or so-called "generator" into the chamber containing the retorts for affording desirable combustion of gaseous matter within said retort-chamber.

I have heretofore devised certain improvements in this line, some of which have been disclosed in my Letters Patent No. 248,335, dated October 18, 1881, No. 284,458, dated September 4, 1883, and No. 346,301, dated July 21, 1886.

In the apparatus of my first-named Letters Patent the atmospheric oxygen was heated above the retort-benches within horizontal ducts occupying horizontal flues leading to the uptake. In the apparatus shown in my said other Letters Patent the atmospheric oxygen is heated above the retorts in ducts surrounding the uptake, and also in horizontal to-and-fro ducts within the masonry above the retort-chamber, and still further while passing in its course downward to the points of delivery into the furnace at the junction of the retort-chamber with the top of the fire-pot or so-called "generator." The use of such circuitous air-heating ducts as were employed in my prior furnaces, as well as heretofore in many others, involves a necessity for air-forcing contrivances, which are dispensed with in the use of my present furnace, because of the great freedom with which air can pass from outside into the furnace and yet be heated in its passage to such a high degree as to produce thoroughly satisfactory results. I now employ for the first time, as I believe, simple straight vertical air-heating ducts, which are located within the lower side walls of the bench, or, in other words in the side walls of the always highly-heated fire-pot or generator, said ducts being arranged in two sets or series—one set on each side—the ducts of each set communicating at their bases with an air-supply duct and at their tops with one or more distributing-chambers located between the top of the fire-pot and the bottom of the retort-chamber.

I am aware that it is not broadly new to locate air-heating ducts within the side walls of the fire-pot or generator; but heretofore the horizontal to-and-fro arrangement of said ducts has always been deemed essential. By the use of my simple vertical ducts I accomplish results more desirable than with the to-and-fro system, both as to supplying sufficient air without forcing contrivances, and also in imparting to the air a proper temperature before discharging it into the retort-chamber, and it will be obvious that in construction the vertical ducts must involve less cost than the to-and-fro horizontal ducts, and also that a side wall containing my vertical ducts will be stronger and more durable than one in which the ducts are horizontal and "to and fro" in their arrangement. My said novel use of vertical air-heating ducts in the side walls of the fire-pot has its prime value, however, when accompanied by a certain novel arrangement of exit-flues through which the products of combustion pass on their way from the retort-chamber to the uptake. In most cases said exit-flues have heretofore been entered at the rear lower corners of the retort-chamber, and they have been horizontally arranged to and fro between the bottom of the retort-chamber and the top of the fire-pot or so-called "generator," and in some cases the exit-openings have been located in the top of the retort-chamber, the flues being partly vertical, but mainly horizontal, and traversing to and fro in their course toward the uptake. I have now for the first time, as I believe, devised and employed simple straight vertical diving-flues in each side wall of the fire-pot, the mouths of said flues being in the bottom of the retort-chamber and along each side thereof. At the bottom of these vertical flues they communicate near the base of the fire-pot with a straight horizontal flue, which enters the uptake at its base. As one result of the use of diving-flues thus arranged the circulating currents within the retort-chamber are more evenly distributed in their contact with the retorts than in any prior furnace known to me, and as a consequence thereof the front portions of the several retorts receive at least their full share of heat, and the lower retorts near each side of the chamber are as well heated as those located above and centrally, as will hereinafter be made fully apparent. As another result of the use of these vertical diving-flues located in the side walls of the fire-pot or so-called "generator," I am enabled in a simple and inexpensive manner to employ therewith vertical air-heating ducts, and for obtaining the best results each of the latter is located within a diving-flue.

I also economize in the construction of a retort-bench, the simple straight vertical diving-flues being much less expensive than the horizontal to and-fro flues, and they are much less liable to get out of order. A side wall containing the vertical flues is stronger, less liable to warp and twist, and hence more durable than one containing a series of horizontal to-and-fro flues, all other conditions being equal. No solid matter can lodge and remain in the vertical flues, as is liable in any horizontal flue.

By the use of the simple diving-flues as arranged by me the draft is so free that the uptake for a bench need seldom, if ever, be higher than the top of the retort-oven, and the waste products of combustion discharged therefrom are at a comparatively low temperature. The air passes through my air-heating ducts with much greater freedom than is possible through horizontal to-and-fro ducts, and, notwithstanding the comparatively short length or height of my ducts, they are thoroughly effective as to heating, because they are not only in close contiguity to the diving-flues, but also because they are located within the highly-heated side walls of the fire-pot.

After fully describing the retort-furnaces illustrated in the drawings, the features deemed novel will be specified in the several clauses of claim hereunto annexed.

Figure 2:
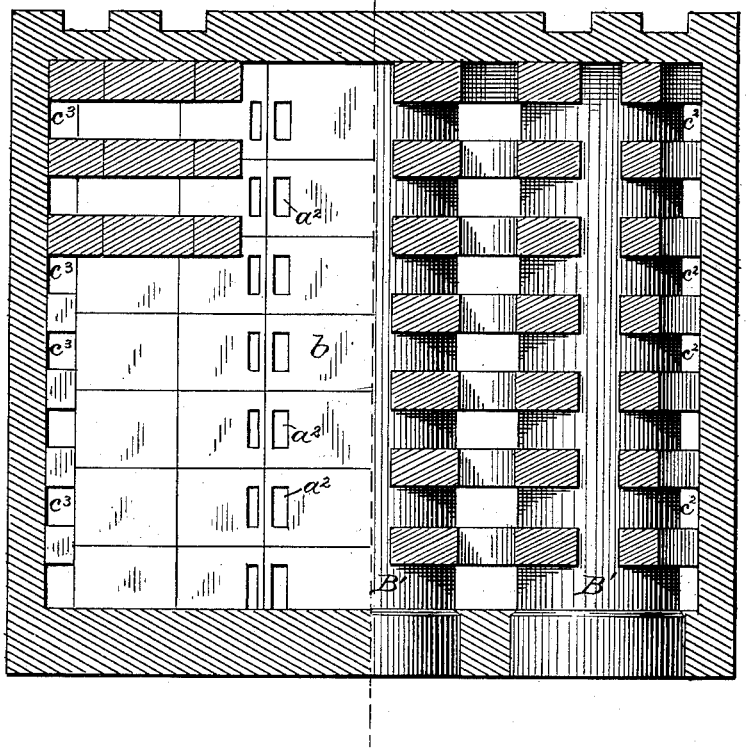
Figure 3:
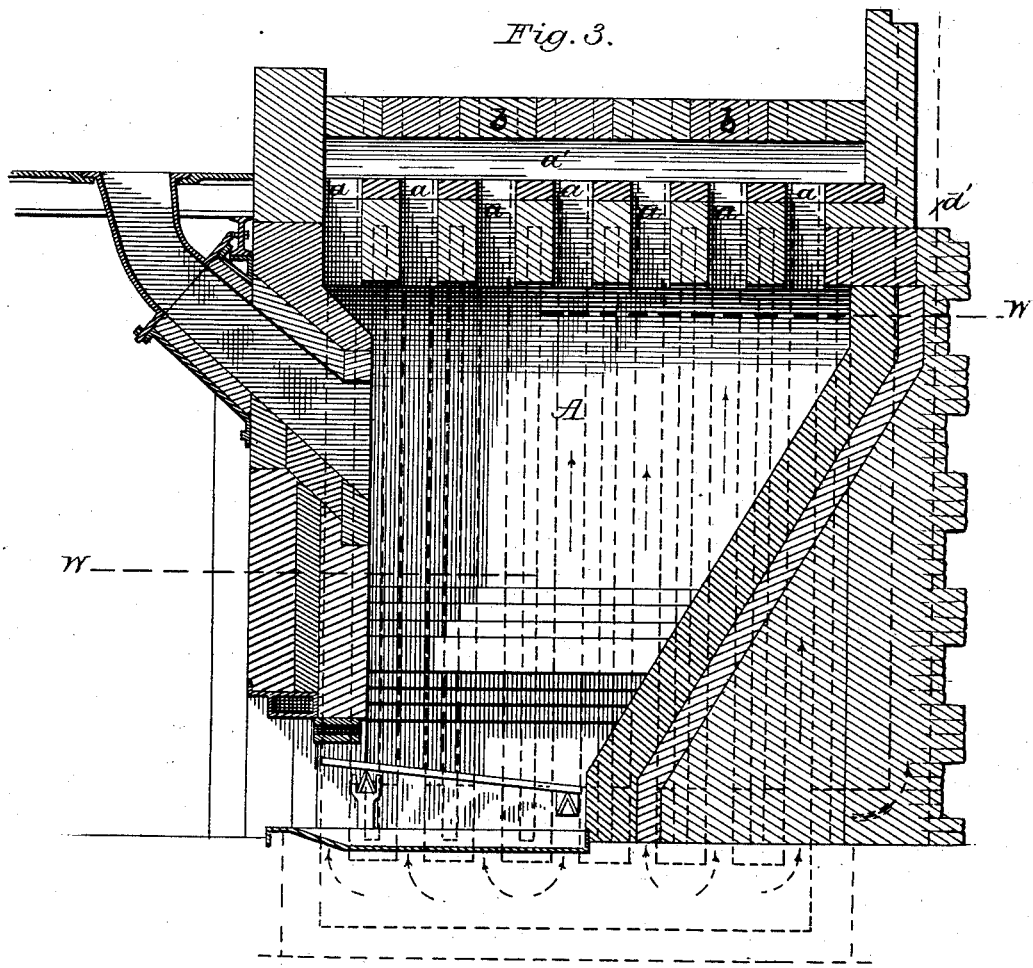
Figure 4:
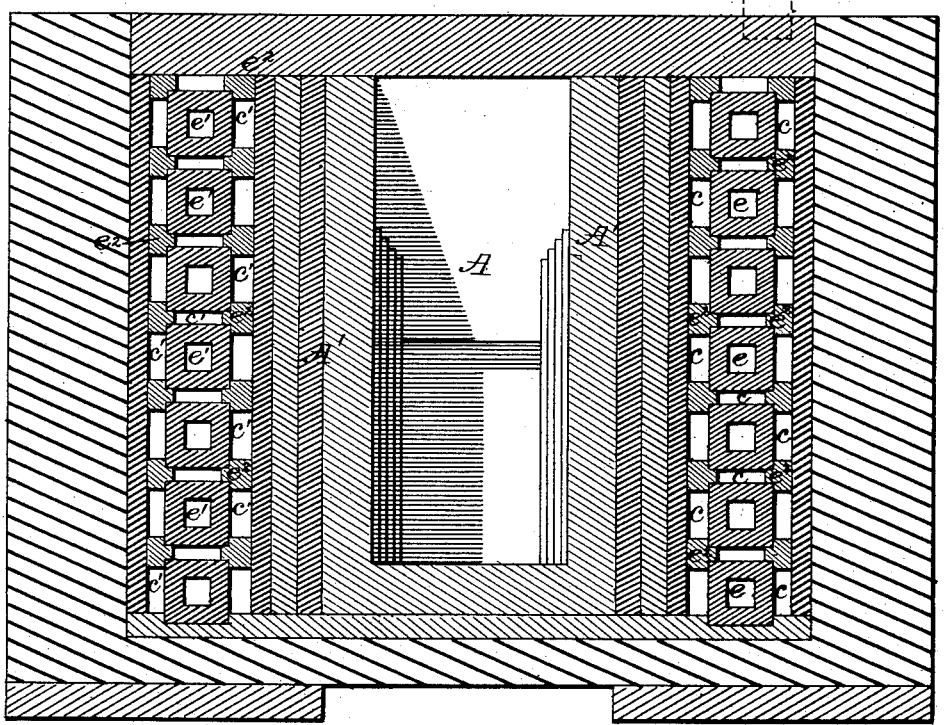
Figure 5:
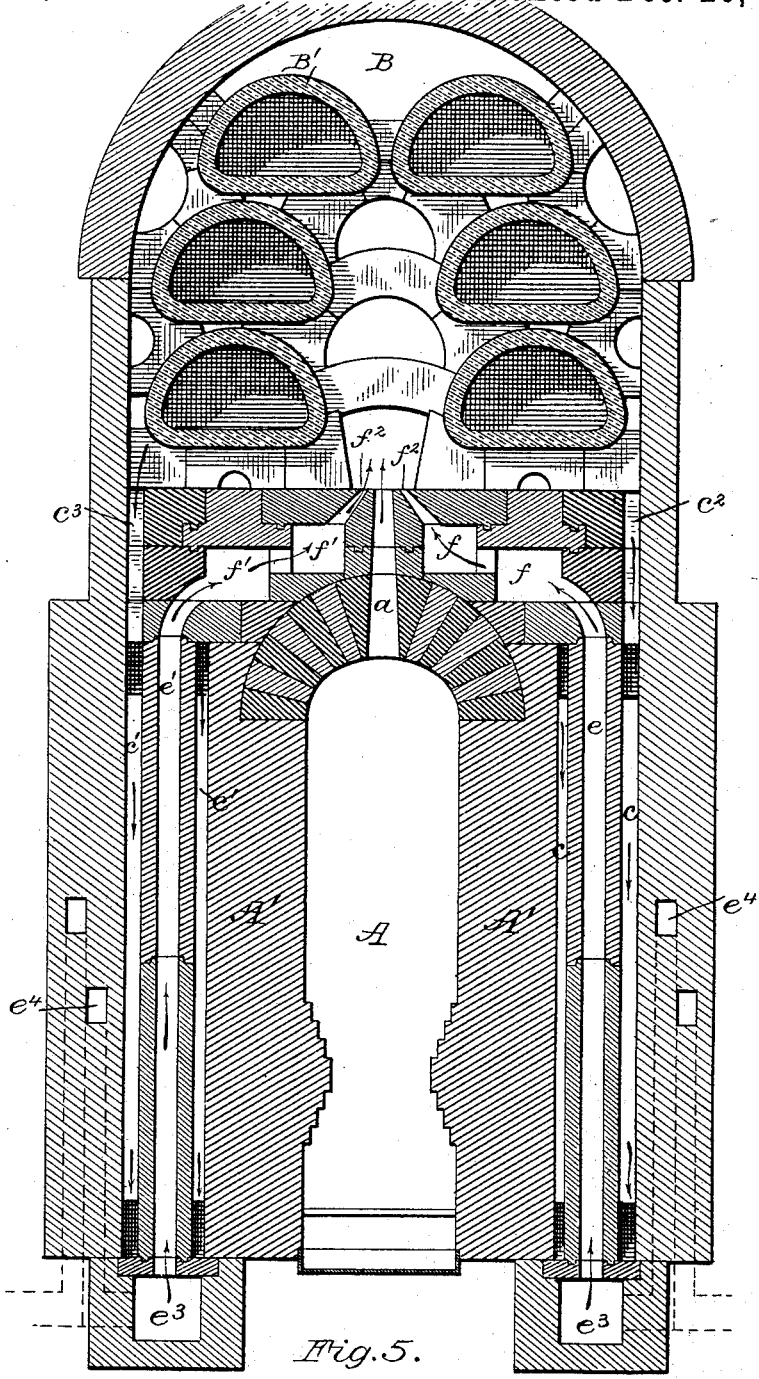
Figure 6:
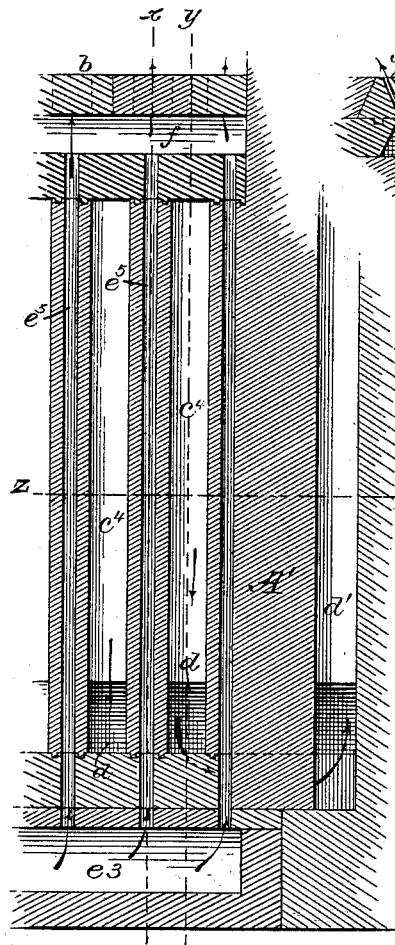
Figures 7, 8:
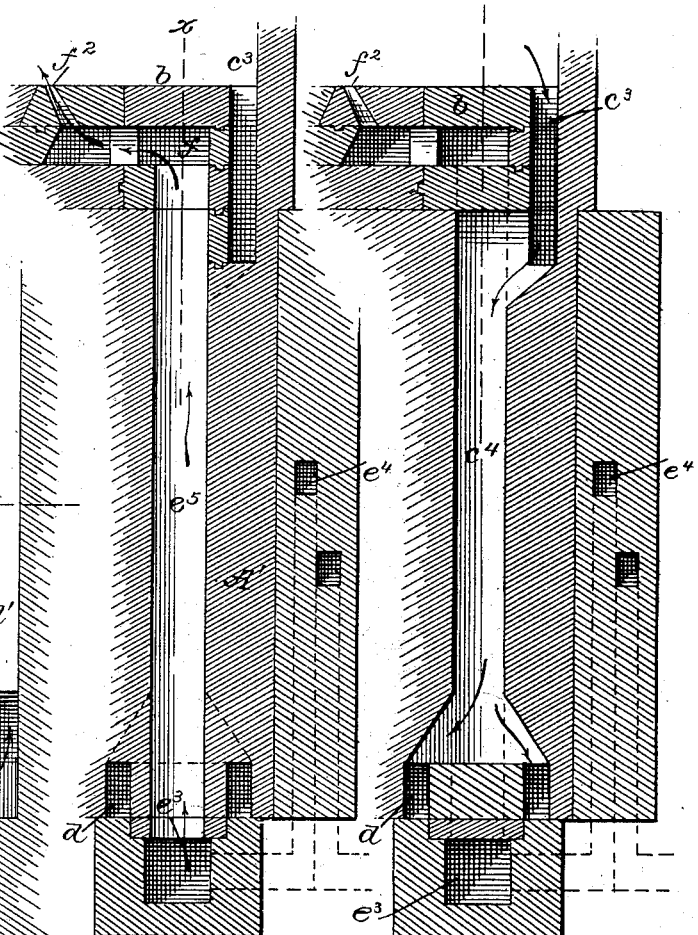
Figure 9:
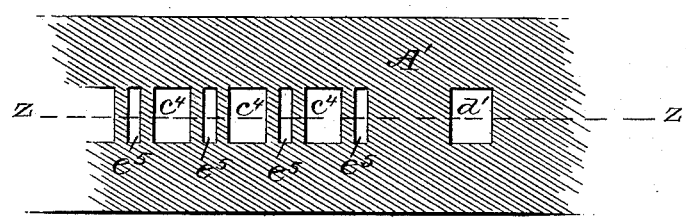

Referring to the drawings, Figure 1 illustrates one of my nine-retort benches in lateral vertical section on a line a little at the rear of the front of the bench. Fig. 2 is a horizontal section of the same on line $v$, Fig. 1. Fig. 3 is a longitudinal central vertical section of the lower portions of the furnace. Fig. 4 is a horizontal section of the same on line $w$, Fig. 3. Fig. 5 is a sectional view similar to Fig. 1, illustrating a six-retort bench embodying my improvements. Fig. 6 illustrates in vertical longitudinal section a portion of the side wall of a furnace containing diving-flues and vertical air-heating ducts under a different arrangement from that illustrated in the previous figures. Figs. 7, 8, and 9 illustrate the same in lateral section on lines $x$, $y$, and $z$, indicated in each figure and also in Fig. 6.

The fire-pot A, or so-called "generator," has a sloping back, which extends rearwardly at its top adjacent to the rear wall of the bench. The top of the fire-pot is arched and provided with a series of ports or ducts, $a$, which in Fig. 1 are shown as opening into a chamber or series of chambers, $a'$, provided with inclined ducts or ports $a^2$ in two series, so that the gaseous educts from the fire-pot will be discharged into the retort-chamber B in numerous oppositely-directed jets or columns through the bottom $b$ of said retort-chamber, which is also sometimes called a "combustion-chamber," wherein the gaseous matters from the fire-pot are consumed when commingled with atmospheric oxygen under favorable conditions. Said chamber B contains the several retorts, B', of which there are nine in the bench illustrated in Fig. 1. These retorts are mounted in the usual manner in supporting-walls of pattern-brick, as clearly indicated, with intervening spaces between said walls for exposing extensive portions of the retorts to the action of the heat.

The retort-chamber is for the first time, as I believe, provided with diving-flues $c$ and $c'$, entered at the numerous ports $c^2$ and $c^3$, there being two sets of said ports—one set at each side of the chamber and through the bottom $b$ thereof—thus affording numerous exits from said chamber arranged in rows extending from front to rear. These diving-flues are simple straight vertical flues located in the side walls, A', of the fire-pot, and at their bases they communicate with horizontal flues $d$, which in turn communicate with uptake flues $d'$, located in the vertical rear wall of the bench, said wall being usually a division-wall between two benches placed back to back. These vertical diving-flues, extending from the bottom of the retort-chamber at its sides downward in the side walls, A', constitute an important novel feature, regardless of their particular construction and whether or not they are employed in connection with air-heating ducts. I have illustrated said diving-flues in two forms. In Figs. 1 to 5, inclusive, each diving-flue $c$ or $c'$ is in one sense a single flue in each side wall; but in another sense there are many such flues in each side wall, because of the presence in each of said flues of a series of air-heating ducts, $e$ or $e'$, and also certain corner supporting-bricks, $e^2$, operating as vertical partitions, as clearly indicated in Fig. 4.

The ports $c^2$ or $c^3$ open downward into the flue-space occupied in part by said air-ducts and directly into the spaces occupying the same vertical plane as the ports; but these spaces communicate with the other three spaces at the other three sides of each air-duct, because the corner bricks, $e^2$, are not used at or near the tops of the air-ducts, thus affording ports or openings which enable the outgoing products of combustion to surround each air-duct from top to bottom. These straight vertical air-heating ducts in the always highly-heated side walls of the fire-pot constitute another valuable feature of my invention regardless of their special form or any particular arrangement thereof with reference to the diving-flues. Said vertical ducts within said side walls have been illustrated in two forms, and arranged with reference to vertical diving-flues in two ways and with diving-flues of two different forms.

In Figs. 1 to 5 said air-heating ducts $e$ $e'$ are square in cross-section, constructed in length sections standing one upon another, and they are confined in place within the diving-flue by the corner bricks, $e^2$, before referred to. Said ducts are here arranged in two series, each at the top communicating with a distributing-chamber, $f$ or $f'$, underlying the bottom $b$ of the retort-chamber, and into the latter the air is delivered through numerous ducts, $f^2$, which are inclined toward an adjacent duct, $a^2$, through which the gaseous educts are delivered from the fire-pot. The several air-heating ducts of each set or series at their bases communicate with a supply-chamber, $e^3$, to which atmospheric air is freely admitted by way of ducts $e^4$, (clearly indicated in dotted lines in Fig. 1,) the entrance thereto being through the front wall of a bench, and it may be controlled by a gate or valve, if desired.

In a bench having six retorts the arrangement of the ducts which connect the fire-pot with the retort-chamber is somewhat different from the bench before described. As shown in Fig. 5, the fire-pot A has a series of ports or ducts, $a$, which lead directly into the retort-chamber B, instead of into one or more intermediate chambers. The diving-flues $c$ and $c'$, with their entrance-ports $c^2$ and $c^3$, the bottom flue, $d$, air-heating ducts $e$ $e'$, and their supply-chambers, are all as before described.

As there are but one set of furnace ducts or ports $a$, the two air-distributing chambers $f$ and $f'$ are in this instance extended toward the center, so that each pair of air-delivery ducts $f^2$ (one from each distributing-chamber) may co-operate with a single furnace duct or port $a$, thus delivering two impinging columns of heated air to each column of educts from the fire-pot or generator.

For obtaining the very best results I locate the air-heating ducts within the diving-flues, as described, so as to have them wholly surrounded by the outgoing highly-heated products of combustion; but approximately desirable results will accrue as to heating the air if the air-ducts be arranged alternately with the diving-flues, and so, also, will those economic results accrue which depend upon the use of straight vertical flues and vertical air-ducts within the side walls of the fire-pot.

As illustrated in Figs. 6 to 9, inclusive, the vertical diving-flues $c^4$ are located within the side wall, A', of the fire-pot, and between each two of said diving-flues there is a vertical air-heating duct, $e^5$. The diving-flues at their tops are entered through ports $c^3$ from the retort-chamber, and these are arranged in a row in the bottom $b$ of said chamber, as before described, and at their bases they communicate with the flue $d$ and uptake $d'$.

The air-heating ducts $e^5$ at their bases communicate with the air-supply chamber $e^3$, as in the other form of furnace, and the same distributing-chambers, $f$, with discharge-ducts $f^2$, are employed. With this construction, as in that previously described, the exits from the retort-chamber to the uptake flue are as free from obstructive influences as they can well be, and the induction of air to said chamber is equally free; but, nevertheless, the air is more effectually heated than by means of any of the prior complex circuitous systems of air-heating ducts and exit-flues of which I have cognizance, and with my furnace an uptake flue need seldom, if ever, extend above the top of the bench.

It will be seen that the gaseous educts from the fire-pot and the hot-air columns are both delivered substantially centrally within the retort-chamber and in one or more longitudinal rows, and that therefore the main combustion is located centrally within the chamber, as in one of my prior furnaces and in others; but it will also be seen that with my diving-flues, after the columns of flame and heat have passed upward centrally within the chamber, they are equally diverted laterally and toward the two sides of the chamber, and thence downward into said diving-flues or the divisions thereof, and that all portions of said retort-chamber are traversed by the heating flames or currents with substantial uniformity, and hence each of the retorts and each part of any one retort receives more nearly its proper share of heat exposure than in any prior gas-retort furnace of which I have any knowledge.

As matters of fact, I will state that from no other furnace of the very many kinds which I have practically operated have I been able to obtain as good results in gaseous yield from the retorts, or in rapidity of operation, or in economy in fuel. The simplicity and inexpensive construction of a furnace embodying my improvements will be apparent, and long practical tests therewith have established its durability and also its capacity for uniform service under variable atmospheric conditions.

Having thus described my invention, I claim as new and desire to secure by Letters Patent—

1. In a gas-retort furnace, the combination, substantially as hereinbefore described, of a chamber containing the retorts, a fire-pot below said chamber and communicating centrally therewith, and vertical diving-flues extending downward in the side walls of the fire-pot, entered by way of a series of ports in a row at each side of said chamber, and communicating at their bases with take-up flues, whereby the flames and heat are evenly diverted from the longitudinal central line of said chamber to both sides thereof and downward, and made to envelop the several retorts and all parts of each with substantial uniformity.

2. In a gas-retort furnace, the combination, substantially as hereinbefore described, of a retort-chamber, a fire-pot below said chamber and communicating centrally therewith, vertical diving-flues at each side of the bottom of said chamber and extending downward within the side walls of the fire-pot, and vertical air-heating ducts within said walls adjacent to and heated by said diving-flues.

3. In a gas-retort furnace, the combination, substantially as hereinbefore described, of a retort-chamber, a fire-pot below said chamber and communicating centrally therewith, vertical diving-flues extending from the bottom of said chamber at each side thereof downward in the side walls of the fire-pot, and vertical air-heating ducts within said diving-flues.

GEORGE A. McILHENNY.

Witnesses:
PHILIP F. LARNER,
W. H. C. BAYLY.